United States Patent
Chen

[11] Patent Number: 6,032,718
[45] Date of Patent: Mar. 7, 2000

[54] ADJUSTABLE SUNSHADE FOR AN AUTOMOBILE

[76] Inventor: Wen-Ho Chen, No. 198, Hsishih Rd., Yungkang City, Tainan Hsien, Taiwan

[21] Appl. No.: 09/324,204

[22] Filed: Jun. 2, 1999

[51] Int. Cl.⁷ .......................................................... B60J 1/20
[52] U.S. Cl. ................................ 160/370.22; 160/370.21; 160/269; 160/302; 160/305; 296/97.7
[58] Field of Search ............................. 160/238, 250, 160/257, 258, 269, 275, 277, 281, 302, 370.21, 370.22, DIG. 2, 305; 296/97.7, 97.8, 97.9, 95.1

[56] References Cited

U.S. PATENT DOCUMENTS

| | | | |
|---|---|---|---|
| 725,728 | 4/1903 | Leon | 160/302 |
| 5,036,898 | 8/1991 | Chen | 160/302 X |
| 5,054,533 | 10/1991 | Lii | 160/302 |
| 5,226,467 | 7/1993 | Lii | 160/370.22 X |
| 5,468,040 | 11/1995 | Hsieh et al. | 160/370.22 X |
| 5,615,924 | 4/1997 | Owen | 160/370.22 X |
| 5,645,119 | 7/1997 | Caruso | 160/370.21 X |
| 5,653,278 | 8/1997 | Cheng | 160/370.22 |
| 5,690,317 | 11/1997 | Sandsborg | 160/302 X |
| 5,752,560 | 5/1998 | Cherng | 160/370.22 |
| 5,791,721 | 8/1998 | Lin | 160/370.22 X |
| 5,813,448 | 9/1998 | Levy | 160/370.21 |
| 5,860,466 | 1/1999 | Kao | 160/370.22 |
| 5,896,910 | 4/1999 | Chen | 160/370.22 |
| 5,961,172 | 10/1999 | Ament et al. | 160/323.1 X |

*Primary Examiner*—Daniel P. Stodola
*Assistant Examiner*—Bruce A. Lev
*Attorney, Agent, or Firm*—Holland & Hart LLP

[57] ABSTRACT

An adjustable electric sunshade for an automobile has a hollow housing; two covers respectively provided on the both sides of the housing and each having a first ratchet formed therein; a winder provided in the housing and driven by a motor; two elbows pivotally mounted in the housing and each having a second ratchet opposing the first ratchet; two handles respectively pivotally mounted on fingers of the elbows extending out from the covers and each having a protrusion which can ensure the engagement of the first and second ratchets; two flexible arms respectively provided on the elbows; a curtain wound on the winder on one end and attached to the flexible arms on another end. The curtain can be extended by the flexible arms. Turning the handles to release the protrusions can disengage the first ratchet from the second ratchet, so that the elbows can be pivoted to adjust the curtain's angle. By this, the sunshade can be adapted to various rear windows.

3 Claims, 6 Drawing Sheets

ADJUSTABLE SUNSHADE FOR AN AUTOMOBILE

BACKGROUND OF THE INVENTION

1. Field of the Invention

The present invention relates to an adjustable sunshade for an automobile, and more particularly to a sunshade that is mounted on the rear window of an automobile and can be adjusted to adapt to various kinds of rear windows with different angles.

2. Description of Related Art

A sunshade is usually provided for an automobile to keep out the sunshine. A conventional sunshade is a curtain directly mounted on the windows by suction cups or other attachment devices. This sunshade is inconvenient to use as the curtain has to be removed when not in use and installed again when in use. Therefore, an electric sunshade was invented for operator convenience.

The electric sunshade is generally mounted below or at the bottom of the rear window. The electric sunshade comprises a base stably mounted below the rear window; a body provided in the base and having a curtain wound thereon; two arms pivotally mounted on both ends of the body and attached to the curtain and driven by a motor. When the motor drives outward, the arms swing out from the body, and the curtain is extended. When the motor drives inward, the arms swing toward the body, and the curtain is folded.

Because various automobiles' rear windows have different angles, the sunshade must be adjustable to adapt to these windows. In this electric sunshade, the body is pivotally mounted on the base and fixed by wing nuts. To release the wing nuts, the body can be pivoted to adjust the angle between the arms and the base. The wing nuts are then tightened again to fix the arms. However, this sunshade is also inconvenient to mount and use. Furthermore, the sunshade has a repulsive appearance as the elements are all exposed.

An adjustable electric sunshade in accordance with the present invention tends to mitigate and/or obviate the aforementioned problems.

SUMMARY OF THE INVENTION

The main object of the present invention is to provide an adjustable sunshade for an automobile that is easy to adjust the angle between the curtain and the rear window.

Another object of the present invention is to provide an adjustable sunshade for an automobile that has an attractive appearance.

Other objects, advantages and novel features of the invention will become more apparent from the following detailed description when taken in conjunction with the accompanying drawings.

DETAILED DESCRIPTION OF THE PREFERRED EMBODIMENT

Figure 1:
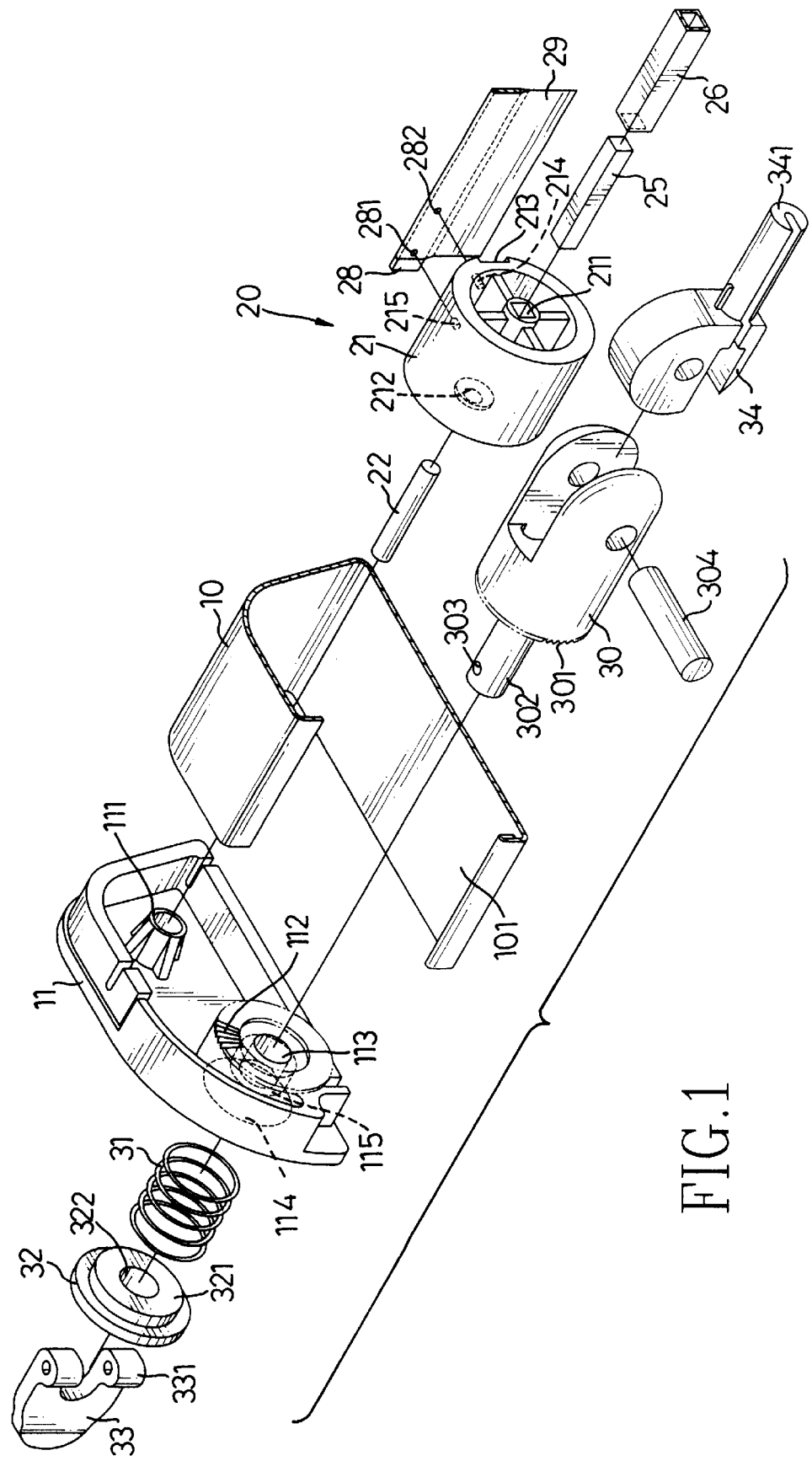
FIG. 1 is a partial exploded perspective view of a sunshade according to the present invention.
Figure 2:
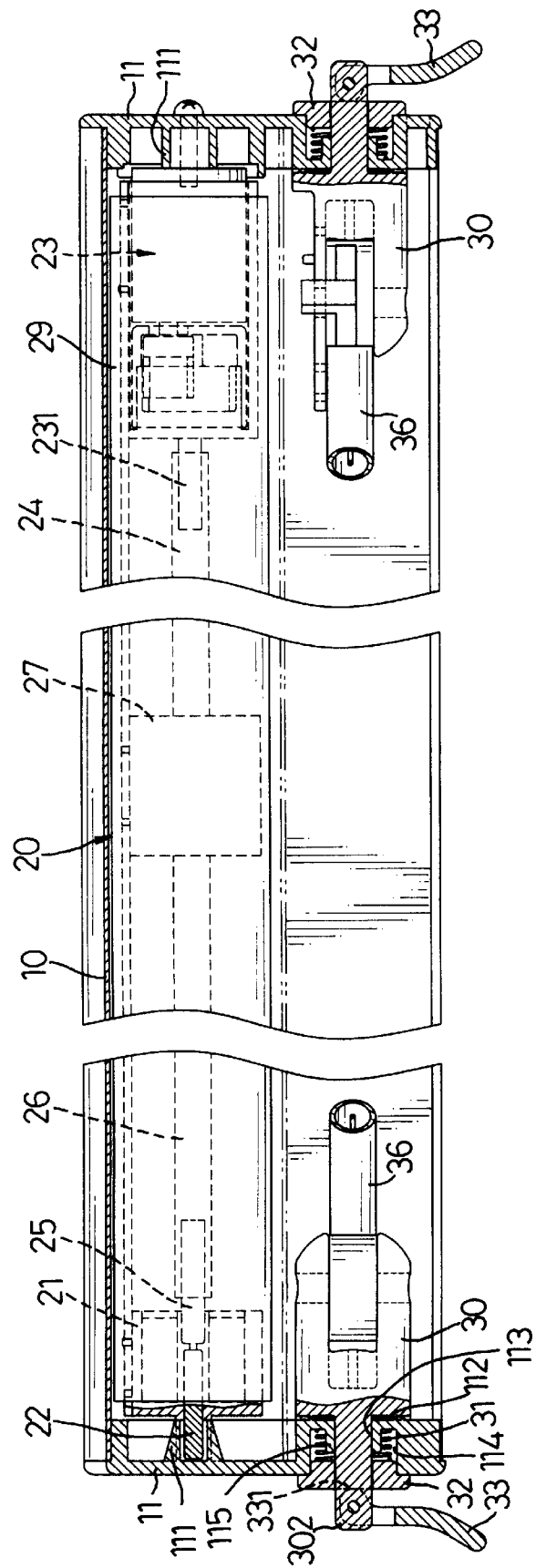
FIG. 2 is a sectional plan view of the sunshade according to the present invention.

Referring to FIGS. 1 and 2, the sunshade in accordance with the present invention comprises a hollow housing (10) with a gap (101) defined therein. Two covers (11) are respectively mounted on both sides of the housing (10). The cover (11) comprises a positioning base (111) formed in the inside rear portion and a first ratchet (112) formed on the inside front portion.

A winder (20) is provided between the two positioning bases (111). The winder (20) comprises a roller (21), a supporting roller (27) and a motor (23). The roller (21) has a fixing hole (212) defined in one end and a receiving hole (211) defined the other end. A pin (22) is received between the fixing hole (212) and the positioning base (111) to be pivotally mounted on one of the covers (11). One end of a rod (25) is inserted into the receiving hole (211), and the other end is connected to a tube (26). The motor (23) is mounted on the other positioning base (111). A shaft (231) extending from the motor (23) is received in another tube (24). The supporting roller (27) is provided between the tubes (24, 26).

Figure 3:
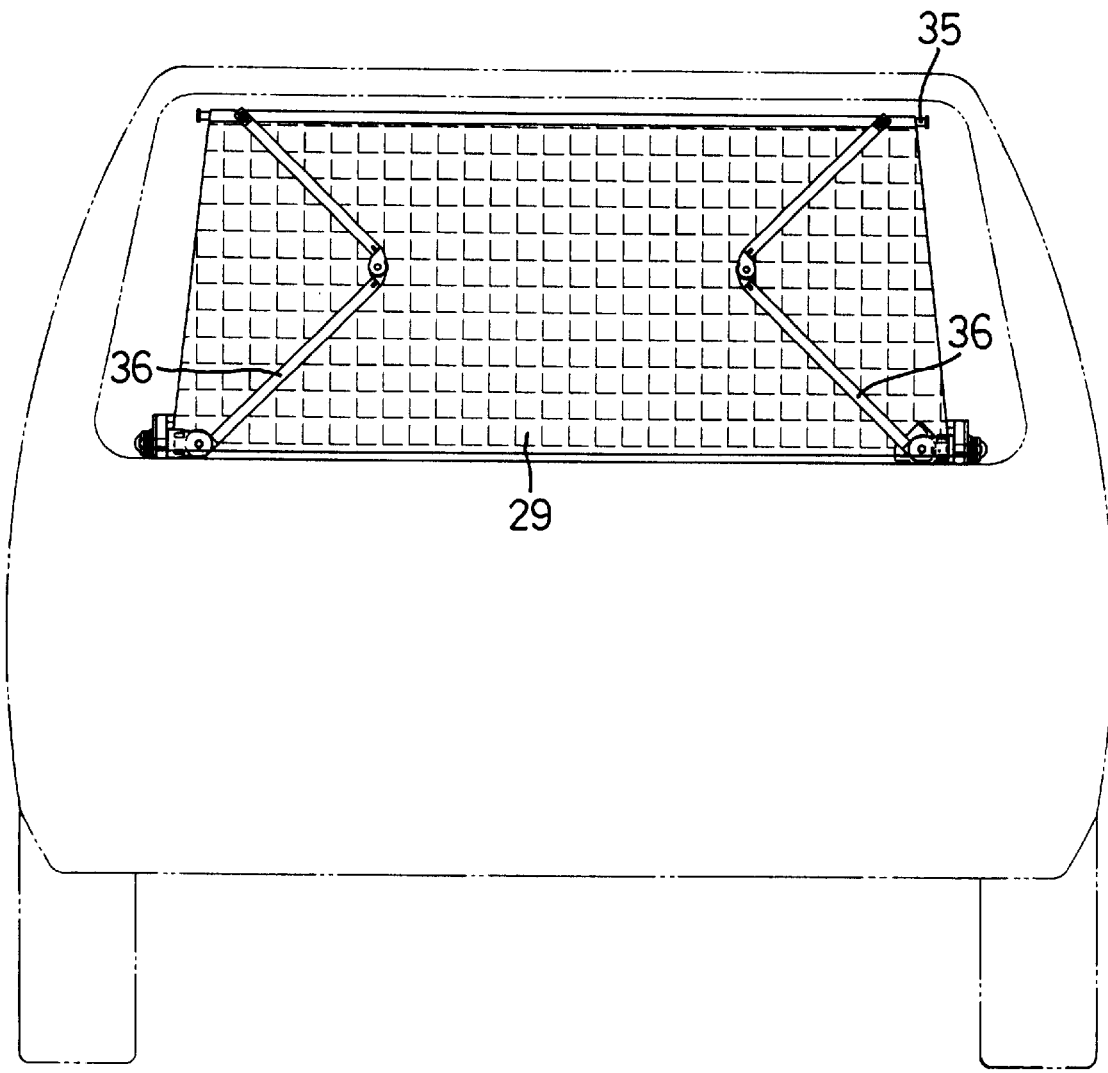
FIG. 3 is a schematic view of the sunshade mounted on the rear window of a automobile.

The roller (21), the supporting roller (27) and the motor (23) respectively have slots (213) aligned with each other. Multiple lugs (214, 215) are formed in the slots (213). A fixed slat (28) for a curtain (29) defines apertures (281, 282) corresponding to these lugs (214) in the slots (213). The fixed slat (28) is received in the slots (213) and the lugs (214) are inserted through the apertures (281). After that, the lugs (214) are riveted and the fixed slat (28) is fastened within the slots (213). The curtain (29) further comprises an unfixed slat (35) provided at the other end of the curtain (29), as shown in FIG. 3. When the motor (23) turns, the curtain (29) can be wound on the winder (20).

The cover (11) defines a recess (114) having a flange (115) formed coaxial with the first ratchet (112) therein. The flange (115) defines a through hole (113) in the first ratchet (112). An elbow (30) having a finger (302) on one end and a joint (34) pivotally connected to the other end by a pivot pin (304) is able to be inserted into the through hole (113). The finger (302) is inserted into the through hole (113) and extend out from the flange (115). A second ratchet (301) is formed on the surface of the elbow (30) opposite to the first ratchet (112) and engages the first ratchet (112). Thereby, the elbow (30) cannot be turned when the first ratchet (112) is engaged with the second ratchet (301).

A spring (31) is disposed around the flange (115). A plug (32) having a rib (321) formed thereon and an opening (322) centrally defined in the rib (321) is mounted on the cover (11) by inserting the rib (321) into the recess (114) to prevent the spring from escaping. The finger (302) also extends out from the opening (322). The finger (302) further comprises a pin aperture (303) defined adjacent the distal end. A U-shaped handle (33) is pivotally attached to the finger (302) by engaging a pin (not numbered or shown) into the pin aperture (303) and the corresponding apertures (not numbered) of the handle (33).

The joint (34) is pivotally mounted the other end of the elbow (30) by a pin (304). A pole (341) is provided in the joint (34) and the distal end of the pole (341) is connected to a flexible arm (36). Referring to FIG. 3, another end of the flexible arm (36) is attached to the unfixed slat (35) of the curtain (29). The flexible arm (36) is located within the gap (101) of the housing (10) and has an upward flexibility, the curtain (29) is pulled out from the gap (101) and can be extended.

Figure 4:
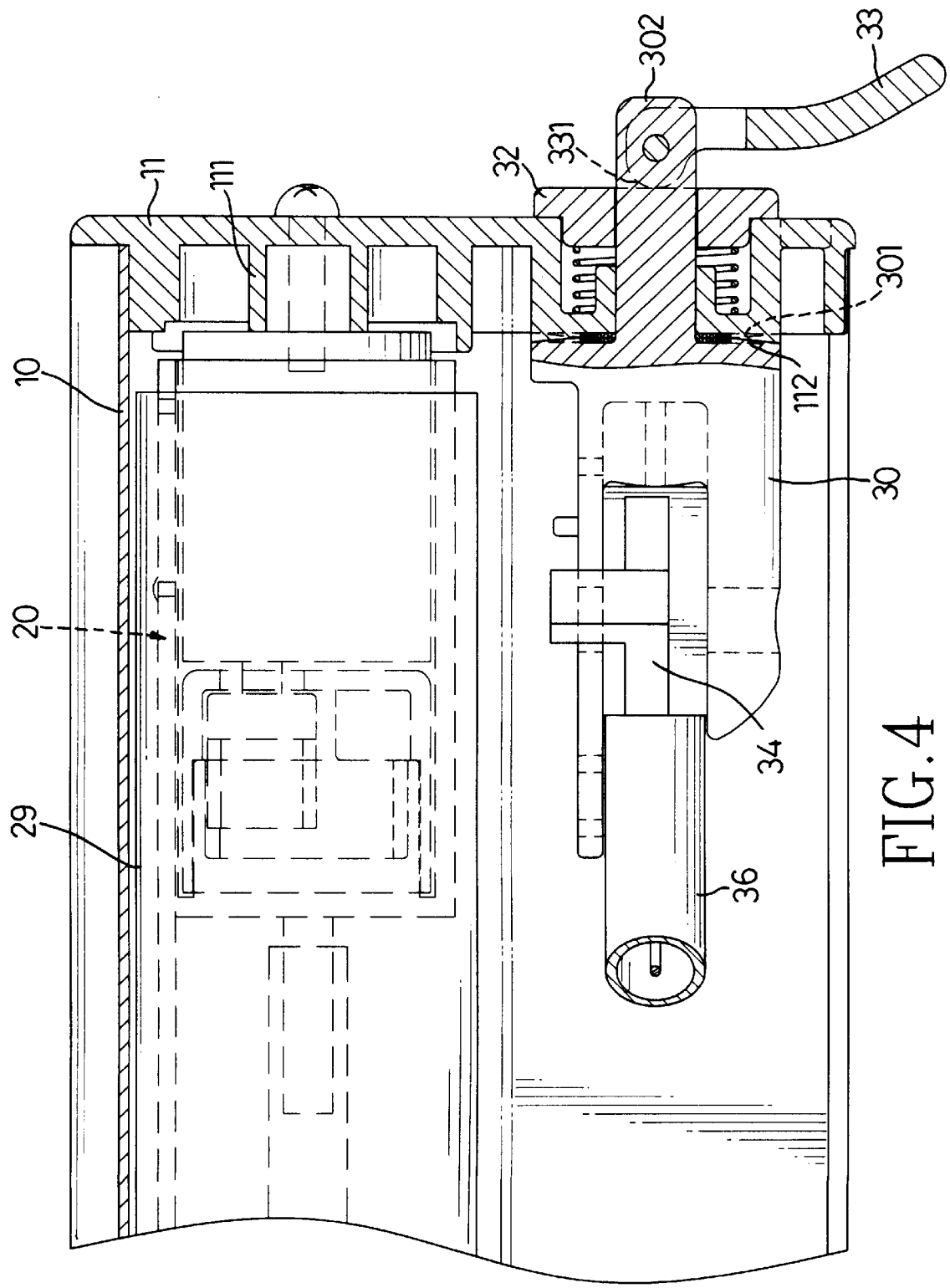
FIG. 4 is a partial sectional view of a first ratchet engaged with a second ratchet of the sunshade in accordance with the present invention.
Figure 5:
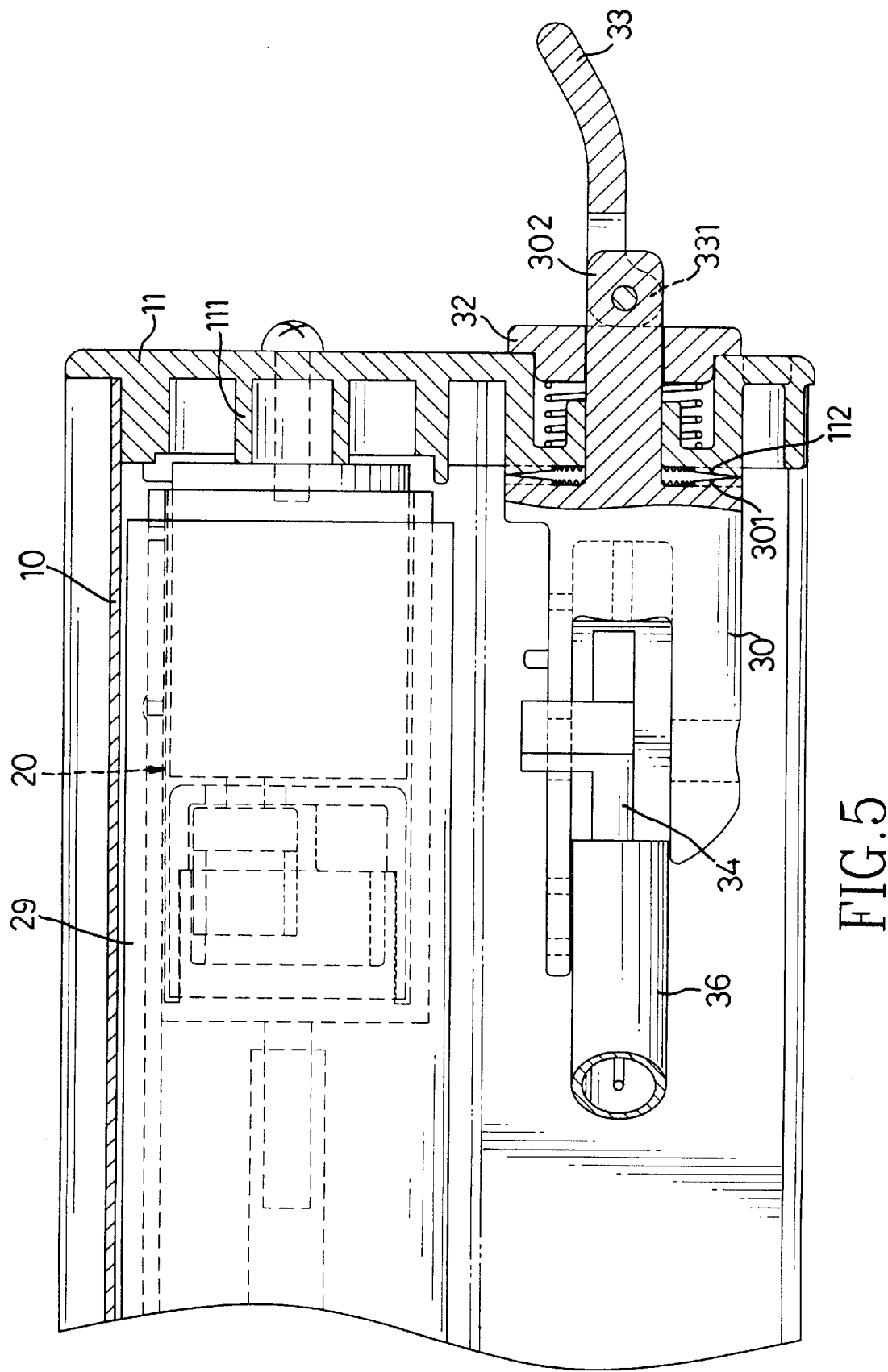
FIG. 5 is a partial sectional view of the first ratchet being disengaged from the second ratchet of the sunshade in accordance with the present invention.
Figure 6:
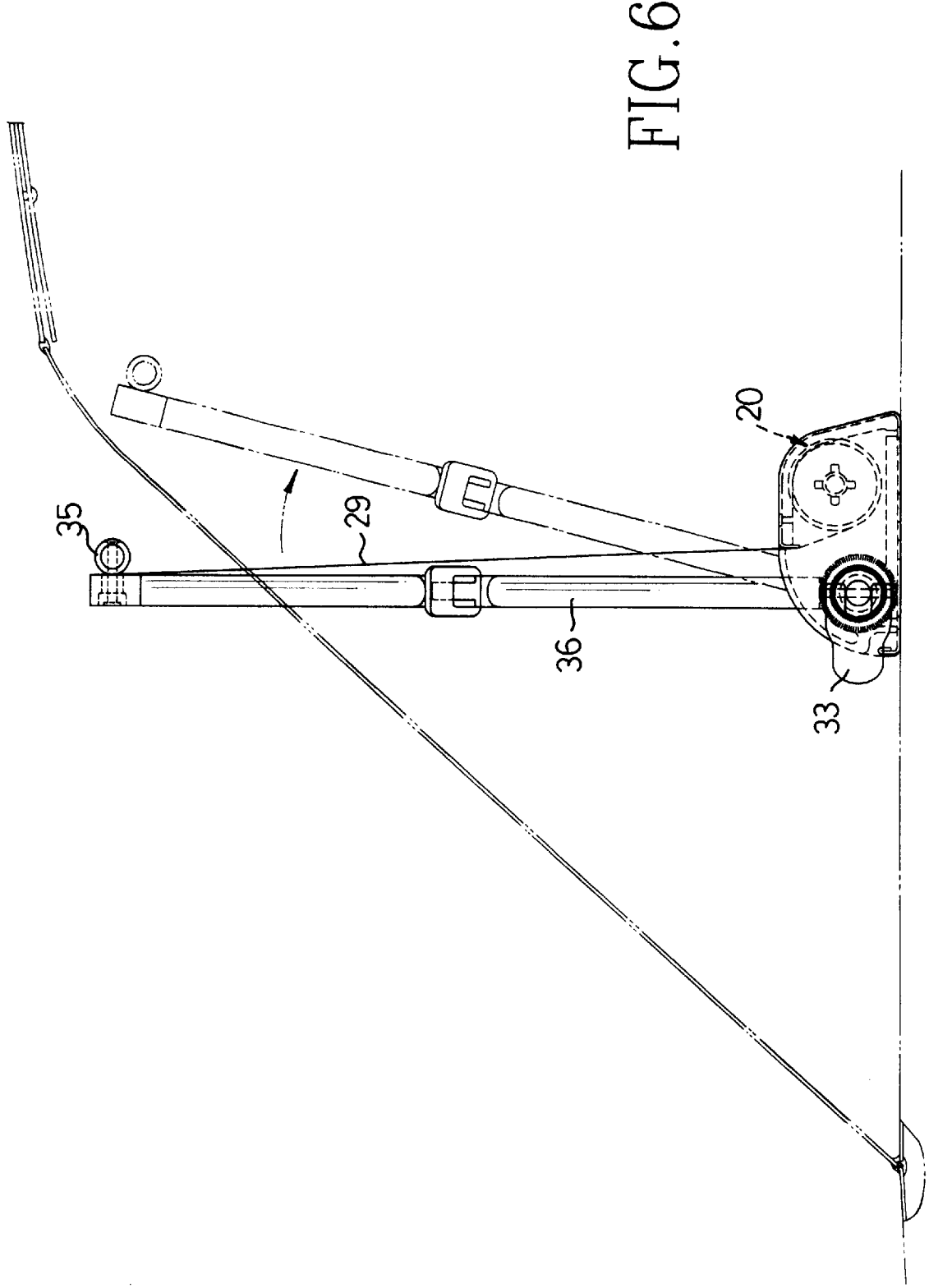
FIG. 6 is a side view showing the adjustment of the flexible arms in accordance with the present invention.

Referring to FIG. 4, the U-shaped handle (33) further forms a protrusion (331) at the connecting portion. The protrusion (331) of the handle (33) presses the plug (32) to ensure the first and second ratchet (112, 301) stay engaged with each other. In this case, the elbow (30) can not be turned. If a user tends to adjust the angle of the curtain (29), the handle (33) is pivoted outwards to separate the protrusion (331) from the plug (32), as shown in FIG. 5. Then, the elbow (30) can be slightly moved inwards so that the first ratchet (112) disengages from the second ratchet (301). Thereby, the user can turn the handle (33) to adjust the angle of the flexible arm (36). After the adjustment is completed, the handle (33) is pivoted to the original position. The protrusion (331) presses the plug (32), and the first ratchet (112) engages the second ratchet (302) again.

The advantages of the present invention are:

1. The angle the curtain can be easily adjusted by turning the handle.

2. Most of elements are hidden in the housing and only the handles are exposed, so the sunshade has an attractive appearance.

It is to be understood, however, even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claim is:

1. An adjustable sunshade for as automobile comprising:
    a hollow housing with a gap defined therein;
    two covers respectively mounted on both sides of the housing and each having:
        a positioning base formed in the inside thereof;
        a first ratchet formed in the inside thereof and located in the gap;
        a recess defined in the outside thereof and aligned with the first ratchet;
        a flange formed in the recess; and
        a through hole defined in the flange;
    a winder pivotally mounted on the positioning base and between the two covers;
    a curtain having a fixed slat fixed on the winder and an unfixed slat attached to two flexible arms;
    two elbows oppositely located in the gap, each having:
        a second ratchet formed in a surface opposite to the first ratchet;
        a finger formed in the surface and inserted into the through hole; and
        a joint to pivotally mount the flexible arm on the elbow;
    two springs respectively disposed around the flange in the recess;
    two plugs respectively to cover the recess and having an opening for the finger inserting through; and
    two handles respectively pivotally mounted on the finger and forming a protrusion, wherein the protrusion can press the plug to engage the first ratchet to the second ratchet when pivoting the handle.

2. The sunshade for an automobile claimed in claim 1, wherein the winder further has a roller pivotally mounted on the positioning base at one side by a pin, a motor provided on the positioning base at another side; and a supporting roller provided between the roller and the motor.

3. The sunshade for an automobile claimed in claim 2, wherein the roller, the supporting roller and the motor all define a slot in their periphery, and the fixed slat of the curtain is fastened in the slot.

* * * * *